United States Patent
Sharifi Mehr

(10) Patent No.: US 9,501,321 B1
(45) Date of Patent: Nov. 22, 2016

(54) WEIGHTED SERVICE REQUESTS THROTTLING

(71) Applicant: AMAZON TECHNOLOGIES, INC., Reno, NV (US)

(72) Inventor: Nima Sharifi Mehr, Vancouver (CA)

(73) Assignee: Amazon Technologies, Inc., Reno, NV (US)

(*) Notice: Subject to any disclaimer, the term of this patent is extended or adjusted under 35 U.S.C. 154(b) by 303 days.

(21) Appl. No.: 14/163,023

(22) Filed: Jan. 24, 2014

(51) Int. Cl.
G06F 9/46 (2006.01)
G06F 9/50 (2006.01)

(52) U.S. Cl.
CPC ............. *G06F 9/5005* (2013.01); *G06F 9/50* (2013.01); *G06F 9/5027* (2013.01)

(58) Field of Classification Search
None
See application file for complete search history.

(56) References Cited

U.S. PATENT DOCUMENTS

| | | | | |
|---|---|---|---|---|
| 5,797,129 A * | 8/1998 | Rohan | G06Q 10/06 | 705/7.22 |
| 5,838,968 A * | 11/1998 | Culbert | G06F 9/5011 | 718/103 |
| 6,711,616 B1 * | 3/2004 | Stamm | H04L 67/42 | 709/223 |
| 7,069,558 B1 * | 6/2006 | Stone | G06F 9/485 | 718/100 |
| 7,565,310 B2 * | 7/2009 | Gao | G06Q 30/0633 | 370/252 |
| 7,665,090 B1 * | 2/2010 | Tormasov | G06F 9/4881 | 718/104 |
| 7,698,251 B2 * | 4/2010 | Brelsford | G06F 17/30489 | 707/802 |
| 7,702,779 B1 * | 4/2010 | Gupta | G06F 9/50 | 709/220 |
| 7,877,754 B2 * | 1/2011 | Birkestrand | G06F 9/5011 | 718/104 |
| 8,260,840 B1 * | 9/2012 | Sirota | G06F 9/5061 | 370/216 |
| 8,321,558 B1 * | 11/2012 | Sirota | G06F 9/5011 | 709/201 |
| 8,782,189 B2 * | 7/2014 | Akiyama | H04L 12/14 | 709/223 |
| 9,336,055 B2 * | 5/2016 | Arao | G06F 9/5011 | |
| 2002/0194251 A1 * | 12/2002 | Richter | G06F 9/5011 | 718/105 |
| 2003/0046396 A1 * | 3/2003 | Richter | G06F 9/505 | 709/226 |
| 2003/0120704 A1 * | 6/2003 | Tran | G06F 9/4843 | 718/104 |
| 2004/0064557 A1 * | 4/2004 | Karnik | G06F 9/5055 | 709/225 |
| 2004/0073661 A1 * | 4/2004 | Eibach | G06Q 30/0283 | 709/224 |
| 2004/0205767 A1 * | 10/2004 | Partanen | G06F 9/4843 | 719/312 |
| 2005/0010608 A1 * | 1/2005 | Horikawa | G06F 9/4862 | |
| 2005/0120111 A1 * | 6/2005 | Bailey | G06F 11/3409 | 709/224 |
| 2005/0125314 A1 * | 6/2005 | Agarwal | G06Q 10/06315 | 705/30 |
| 2006/0150190 A1 * | 7/2006 | Gusler | G06F 9/5011 | 718/105 |
| 2006/0167699 A1 * | 7/2006 | Rontynen | G06Q 10/10 | 705/26.1 |
| 2006/0168586 A1 * | 7/2006 | Stone | G06F 9/485 | 718/104 |
| 2006/0206900 A1 * | 9/2006 | Ooyama | G06F 9/5083 | 718/105 |
| 2007/0074207 A1 * | 3/2007 | Bates | G06F 9/4881 | 718/1 |
| 2007/0220327 A1 * | 9/2007 | Ruscio | G06F 11/1438 | 714/17 |
| 2007/0226389 A1 * | 9/2007 | Poortman | G06F 11/3419 | 710/117 |
| 2008/0034093 A1 * | 2/2008 | Sutou | G06F 9/5083 | 709/226 |
| 2009/0144739 A1 * | 6/2009 | Goel | G06F 9/4843 | 718/103 |
| 2010/0043009 A1 * | 2/2010 | Marchand | G06F 9/4881 | 718/104 |
| 2010/0157822 A1 * | 6/2010 | Ivanov | H04L 41/5009 | 370/252 |
| 2011/0295986 A1 * | 12/2011 | Ferris | G06F 9/5072 | 709/222 |
| 2012/0005685 A1 * | 1/2012 | Chen | G06F 9/5072 | 718/104 |
| 2013/0086590 A1 * | 4/2013 | Morris | G06F 9/5011 | 718/102 |
| 2013/0246507 A1 * | 9/2013 | Amemiya | H04L 67/2814 | 709/203 |

* cited by examiner

Primary Examiner — Hiren Patel
(74) Attorney, Agent, or Firm — Lindauer Law, PLLC

(57) ABSTRACT

Computing platforms may enable clients to use services to execute data processing tasks. Each of these services consumes resources during execution. Described herein are systems, devices and methods for generating resource consumption data for service calls. The resource consumption data may indicate amounts of resources consumed to process computational tasks associated with service calls. The system may determine when to process computational tasks based on the resource consumption data.

20 Claims, 7 Drawing Sheets

WEIGHTED SERVICE REQUESTS THROTTLING

BACKGROUND

Services executing on computing devices support a wide variety of data processing jobs. A given service call may utilize several resources such as memory, processor time, input/output, and so forth. As information processing systems continue to grow in size and complexity with many interconnected services processing information in ever more complicated service call patterns, determining the resource usage associated with service calls becomes challenging.

Figure 1:
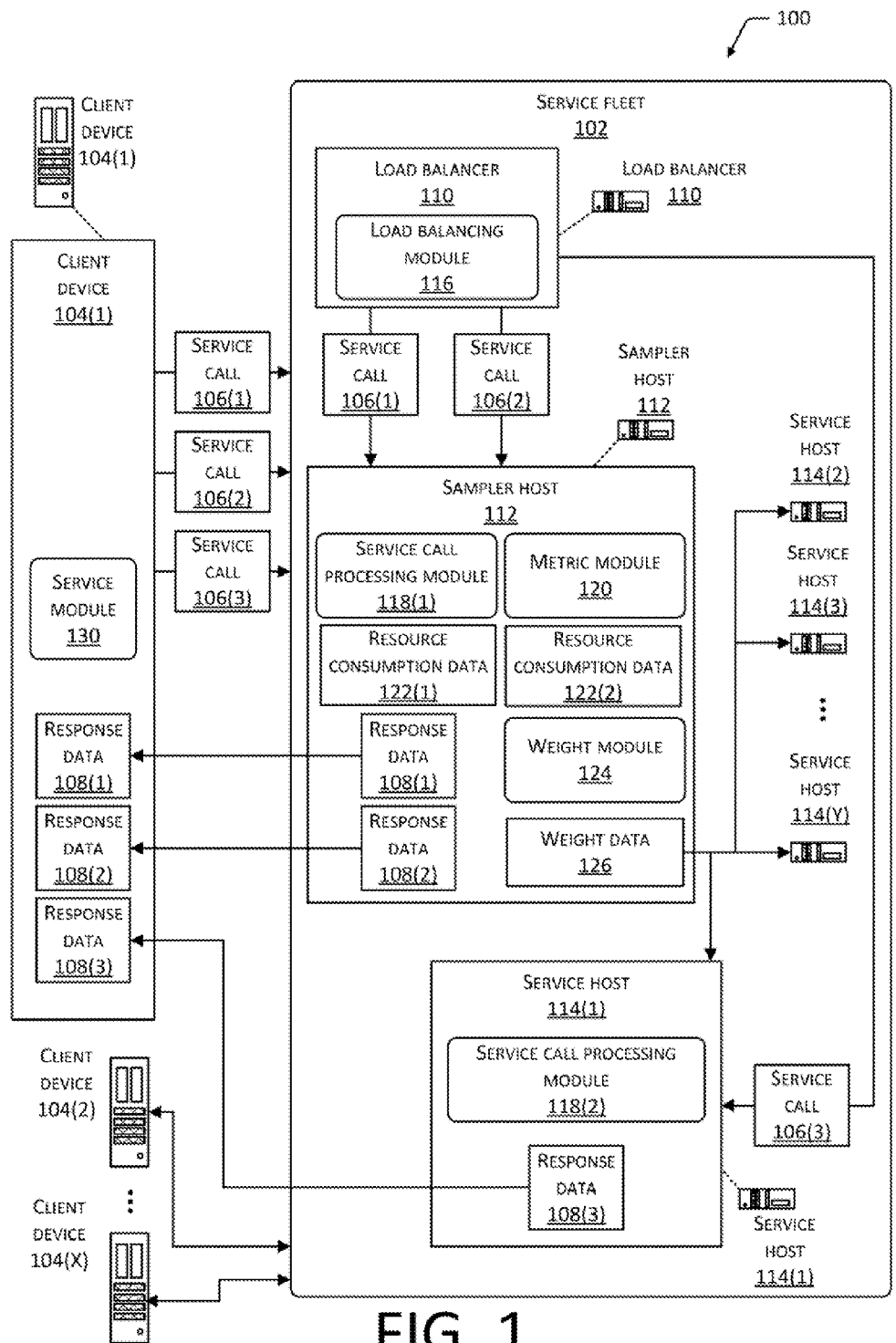
FIG. 1 is a block diagram of a system configured to generate and provide weight data to service hosts.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Computing devices may execute a wide variety of services. The service may be a set of instructions that execute on a service fleet to perform one or more computational tasks. For example, the service may calculate a value from inputs, retrieve information from a datastore, and so forth. Service fleets may perform a service in response to receiving a service call from a computing device. The service call may comprise data representing a request to the service fleet to perform the service. Processing the service call utilizes several resources such as memory, processor time, input/output, and so forth. Service calls may have different types. One type of service call may share a first set of characteristics, and another type of service call may share a second set of characteristics. The service calls may be different in layout, composition, encoding, and so forth. Service fleets may be configured to process a particular type of service call based on the amount of resources that type of service call is expected to consume. This disclosure relates to systems and methods for determining resource consumption for service calls processed by service fleets. Using the resource consumption information, the service fleets may regulate rates at which service calls are processed, resulting in a system having increased stability.

The service fleet may include a plurality of hosts comprising computing devices such as servers. The service fleet may include a sampler host configured to process a single service call for a single client at a time. By performing a single job for a single client, the system may generate resource consumption data for individual service calls for individual client devices. If the sampler host was processing more than one service call at one time, determining which resources are being consumed by which service call may be difficult because the metrics for a computing device which are used to determine the amount of consumption are generally provided for the entire computing device, not at the level of each service call. When the sampler host processes a single service call, the sampler host may be performing other computational tasks such as computational tasks that manage the system hardware. Processing a single service call at a time may be visualized as processing service calls in sequence.

In some implementations, the sampler host is configured to contemporaneously process the service calls. Contemporaneous processing may include processing in which the corresponding service calls are processed such that they are processed exactly simultaneously, or may be within a predetermined window of time, such as within ±50 milliseconds ("ms") of one another. In these implementations, the sampler host determines the resource consumption for each particular service call. The sampler host may include multiple hardware processors configured to individually process the service calls.

Using the resource consumption data, the sampler host may be configured to generate weight data. The weight data may indicate a value generated based at least on averages of different amounts of resources consumed to perform a given type of service call. The resources consumed may include memory, processor, data transfer, and so forth. The value may be expressed as a number, for example, between 1 and 1000.

The sampler host may be configured to generate weight data based on formula data which is applied to the resource consumption data. The formula data may be configurable. The service fleet may enable an administrative user of the service fleet to configure the formula data applied to the resource consumption data to determine the weight data. For a particular type of service call, an administrative user may desire to manage which metrics are used to generate the weight value based on a historical analysis of which metrics correspond to a need to purchase additional resources.

The sampler host may be configured to determine whether to provide the weight data to one or more service hosts that are included in the service fleet. In one example, the sampler host provides the weight data to the service hosts once a threshold amount of resource consumption data has been generated for a particular type of service call. The more resource consumption data being generated and stored for a type of service call, the more accurate the value of the weight data may be. This is because the value of the weight data is determined based on an average amount of resources consumed by the service calls.

The service hosts may be configured to contemporaneously process two or more service calls. Contemporaneous processing may include processing in which the corresponding service calls are processed such that they are processed exactly simultaneously, or may be within a predetermined window of time, such as within ±50 ms of one another.

The service hosts may use the weight data to determine when to process various service calls. The service host may implement a throttling mechanism to determine when to process the service calls. The throttling mechanism may be configured to organize the order of a plurality of service calls within a queue of the service hosts for future processing. The throttling mechanism may slow down certain types of service calls being processed, which may prevent the service fleet from failing or overloading. The throttling mechanism may also be described as a mechanism used to keep a service available to all its client devices and prevent a client device from going beyond its allowed resource consumption.

To perform the service, the service fleet may call upon other predecessor computing devices such as another service fleet. The service fleets used to complete a particular job may comprise a service call pattern. For example, a client device may request a first service fleet to provide particular data. In response to receiving the request, the first service fleet may request an additional service fleet to provide additional data to the first service fleet. Once the first service fleet receives the additional data, the first service fleet may perform a computational task by generating the particular data requested, and transmitting the particular data to the client device. The first service fleet and the second service fleet thus comprise a service call pattern.

The weight data provides various benefits to system administrators, planners, troubleshooters, and other stakeholders. Alarms may be set to indicate unexpected changes in weight data for a service call which may indicate trouble or an unusual situation. The weight data may be analyzed for trending, to determine when capacity needs to be added or removed. The weight data may be used to determine cost data or invoice data associated with service calls. This cost data may be used to optimize particular service calls after identifying which service calls are associated with relatively high costs. Using the techniques described here, stakeholders are thus able to more easily and effectively manage their systems.

Illustrative System

FIG. 1 is a block diagram of a system 100 configured to generate and provide weight data to service hosts. The system 100 includes a service fleet 102 operatively connected to client devices 104(1), 104(2), ... 104(X) using a network (not shown). As used in this disclosure, letters in parenthesis such as "(X)" indicate an integer value. The client device 104 provides service calls 106 to the service fleet 102 for processing. The service calls 106 may comprise data representing a request for the service fleet 102 to execute one or more computational tasks. The computational tasks may include calculating values from inputs, retrieving information from a database, and so forth. The service fleet 102 may provide response data 108 to the client device 104 using the network. The response data 108 may comprise information requested by the service call 106.

The network facilitating communication between the service fleet 102 and the client devices 104 may include a variety of networks, such as a local network, a wide area network ("WAN"), broadcast network, a personal area network ("PAN"), a wired and wireless local area network ("LAN"), and so forth. In some implementations, the network includes at least one of Ethernet, Wi-Fi™ as promulgated by the Wi-Fi Alliance, 3G and 4G, Bluetooth® as promulgated by the Bluetooth Special Interest Group, and so forth. In some implementations, the devices and systems described herein are configured to directly connect to each other. The system 100 may include additional servers which communicate with the service fleet 102 and the client devices 104.

The service fleet 102 may include one or more host computing devices. The host computing devices may work in conjunction with one another, making computational requests to one another and providing responses to one another. The host computing devices may comprise computing devices such as servers. In FIG. 1, the host computing devices include a load balancer 110, a sampler host 112, and one or more service hosts 114(1), 114(2), 114(3), ... 114(Y). The host computing devices may include hardware which may comprise mechanical, magnetic, optical, and electrical devices, such as processors, storage devices, I/O interfaces, and so forth. The host computing devices may be the same or similar in hardware, construction, components, modules, and so forth when compared to one another.

The service fleet 102 performs services for the client devices 104. The service may be a set of instructions that execute on the hardware to perform data processing tasks. For example, the service may calculate a value from inputs, retrieve information from a database, and so forth.

The load balancer 110 may include a load balancing module 116. The load balancing module 116 may be configured to receive or access the service calls 106. For example, in FIG. 1, the load balancer 110 receives the service calls 106(1), 106(2), and 106(3) from the client device 104(1).

In some implementations, the load balancing module 116 provides a service call to the sampler host 112 or the service host 114. For example, in FIG. 1, the load balancer 110 provides the service calls 106(1) and 106(2) to the sampler host 112, and provides the service call 106(3) to the service host 114(1). The determination of whether or not to provide a given service call 106 to the sampler host 112 or the service host 114 is discussed in more detail below.

The sampler host 112 may include a service call processing module 118(1) configured to process one or more requested computational tasks. The service call processing module 118(1) may generate the response data 108. In FIG. 1, the service call processing module 118(1) processes computational tasks for the service call 106(1), and generates the response data 108(1) which includes information requested by the service call 106(1). The service call processing module 118(1) also performs computational tasks for the service call 106(2), and generates the response data 108(2) which includes information requested by the service call 106(2).

The service call processing module 118(1) may be configured to process a single service call 106 at a time. In FIG. 1, the service call processing module 118(1) processes the service call 106(1), and then processes the service call 106(2). The service call processing module 118(1) may not contemporaneously process the service calls 106(1) and 106(2). By configuring the service call processing module 118(1) to process a single service call 106 at a time, the sampler host 112 is able to determine the amount of resources consumed for the single service call 106. If the service call processing module 118(1) processes more than one service call 116 at one time, determining which resources are being consumed by which service call 106 may be difficult. In some implementations, the service call processing module 118(1) is configured to contemporaneously process the service calls 106(1) and 106(2). Contemporaneous processing may include processing in which the corresponding service calls 106(1) and 106(2) are processed such that they are processed exactly simultaneously, or may be within a predetermined window of time, such as within ±50 ms of one another. In these implementations, the sampler host determines the resource consumption for each particular service call. The service processing module 118(1) may operate with a first hardware processor to individually process the service calls 106(1), and a second hardware processor to individually process the service call 106(2).

The service host 112 may generate metric data (not shown) comprising information about one or more metric values indicative of one or more quantitative measurements of operation or performance while executing one or more computational tasks. The service fleet 102 may include a metric module 120 configured to generate the metric data. As described in more detail below, the metrics may include processor usage, memory usage, disk usage, and so forth.

The metric data may include resource consumption data 122. The resource consumption data 122 may include a value indicating one or more amounts of one or more resources consumed to perform one or more computational tasks that are requested by the service calls 106 and processed by the service call processing module 118(1). The resources consumed may include a variety of resources, such as memory resources, processing resources, and so forth. The value may be expressed as a number having values, for example, between 0.01 and 1000.00. In FIG. 1, the metric module 120 generates the resource consumption data 122(1) indicating an amount of resources consumed to perform one or more computational tasks to process the service call 106(1). The metric module 120 generates the resource consumption data 122(2) indicating an amount of resources consumed to perform one or more computational tasks to process the service call 106(2).

The sampler host 112 may include a weight module 124 configured to generate weight data 126. The weight data 126 may include a value generated based on an average amount of resources consumed to perform certain service calls 106. The weight module 124 may be configured to generate the weight data 126 based at least on the resource consumption data 122(1) and 122(2). In FIG. 1, the weight data 126 includes a value indicating the average amount of resources consumed to process the service calls 106(1) and 106(2). The sampler host 112 stores the weight data 126 once it is generated. In other examples, the weight data 126 may be stored in other devices, such as a datastore separate from the sampler host 112.

In some implementations, the value of the weight data 126 is generated based on formula data (not shown). The formula data may be used to determine a sum of different averages of amounts of different resources consumed. For example, for a given type of service call 106, the weight module 124 may determine that the average amount of memory usage is 50 units, and that the average amount of processor usage is 25 units. The weight module 124 may determine the value of the weight data 126 by summing the 50 units and the 25 units, indicating a value of 75 units.

While the value of weight data 126 is described with regard to averages of resource consumption, in other implementations other mathematical or logical operations may be used. For example, the weight module 124 may determine the value of the weight data 126 based on information indicative of a maximum amount of resources consumed to perform the service calls 106. In another example, the weight module 124 may determine the value of the weight data 126 based on information indicative of a cost to perform the service calls 106. The cost may be determined by the amount of resources consumed to perform one or more service calls 106. In some implementations, the value of the weighted data 126 is determined using a nonlinear function or operation. In one example employing a nonlinear function, a first value of "1" may correspond to a weight value of "4", a second value of "2" may correspond to a weight value of "5", and a third value of "3" may correspond to a weight value of "10".

In some implementations, the service fleet 102 may enable a user to select or change the metrics used to generate the weight value, how those metrics are individually weighted, and so forth. For a particular type of service call 106, an administrative user may desire to manage which metrics are used to generate the weight value based on a historical analysis of which metrics correspond to a need to purchase additional resources. The metrics used to generate the weight data 126 may be different for different client devices 104 and/or service calls 106. For example, a first set of metrics (e.g., processor usage and memory usage) may be selected and used to generate the weight value for the service call 106(1), and a different, second set of metrics (e.g., disk usage and latency) may be selected and used to generate the weight value for the service call 106(2).

Service calls 106 may have different types. For example, the service calls 106 may be different in layout, composition, encoding, and so forth. A first client device 104 may generate a first type of service call 106 having a first type or expression, and a second client device 104 may generate a service call having a second, different type or expression. In some implementations, a single client device 104 may be configured to generate different types of service calls 106.

The weight module 124 may be configured to generate different weight data 126 for different service client devices 104 and/or service calls 106. For example, the weight module 124 may generate first weight data 126 associated with a first type of service call 106, and may generate second weight data 126 associated with a second type of service call 106.

The sampler host 112 may determine whether to provide the weight data 126 to one or more service hosts 114. For a given service call 106, the sampler host 112 may not provide the weight data 126 to the service hosts 114 until enough resource consumption data 122 has been generated for a given type of service call 106. For example, for a given service call 106, the sampler host 112 may not be configured to provide the weight data 126 to a given service host 114 until at least 100 service calls 106 have been handled by the sampler host 112. Because the weight data 126 is based on an average, administrative users may feel more confident in the accuracy and the ability to predict the amount of resources a given service call 106 will consume after some threshold amount of service calls 106 has been analyzed. In another example, the sampler host 112 may be configured to provide the weight data 126 to the service hosts 114 once the sampler host 112 is able to predict the amount of resources consumed for a given type of service call 106 within a predetermined threshold. The predetermined threshold may include a 5% error rate.

The load balancing module 116 may determine whether or not to provide a particular service call 106 to the service hosts 114 based on whether a threshold amount of resource consumption data 122 has been generated for a particular type of service call 106. In one example, in response to a determination that less than the threshold amount of resource consumption data 122 has been generated, the load balancing module 116 provides a given service call 106 to the sampler host 112. In response to a determination that more than the threshold amount of resource consumption data 122 has been generated, the load balancing module 116 provides the given service call 106 to one or more service hosts 114 for processing.

In another example, the load balancing module 116 provides a particular service call 106 to the sampler host 112 based on a predetermined time interval. For example, for a given type of service call 106 from a given client device 104, the load balancing module 116 may be configured to provide the service call 106 to the sampler host 112 every hour, or every 24 hours. In FIG. 1, the service fleet 102 includes the load balancer 110. In some implementations, the load balancer 110 is separate from the service fleet 102 and is in communication with the service fleet 102 using the network.

The service host 114 may be configured to process one or more service calls 106. In some implementations, a single service host 114 is configured to contemporaneously process two or more service calls 106. Contemporaneous processing may include processing in which the corresponding service calls 106 are processed such that they are processed exactly simultaneously, or may be within a predetermined window of time, such as within ±50 ms of one another.

The service host may include a service call processing module 118(2). For example, in FIG. 1, the service host 114(1) includes the service call processing module 118(2). The service call processing module 118(2) may be configured to perform one or more requested computational tasks. For example, the service call processing module 118(2) may calculate a value from inputs, retrieve information from a database, and so forth. The service call processing module 118(2) may generate response data including information requested by the client device 104. In FIG. 1, the service call processing module 118(2) performs computational tasks for the service call 106(3), and generates the response data 108(3) which includes information requested by the service call 106(3).

The service call processing module 118(2) may be configured to determine when to process service calls 106 based on the weight data 126. For example, the service call processing module 118(2) may implement a throttling mechanism to determine when to process the service calls 106. The throttling mechanism may be configured to organize a plurality of service calls 106 within a queue for future processing. The throttling mechanism may slow down certain types of service calls 106 being processed, which may prevent the service fleet 102 from failing or overloading. The throttling mechanism may also be described as a mechanism used to keep a service available to all its client devices 104 and prevent a client device 104 from going beyond its allowed resource consumption.

The client device 104 may comprise one or more computing devices, which can perform functions described in this disclosure. In some implementations, the client device 104 comprises one or more computing devices configured to process service calls 106 for other computing devices (not shown). The client device 104 may comprise another service fleet 102. The client device 104 may include a variety of other devices, such as a mobile digital device, a smartphone, a tablet computer, a desktop computer, a laptop computer, a television, an electronic book ("eBook") reader, a gaming console, a set-top box, a media player, an in-vehicle communication system, a wearable computing device and so forth.

The client device 104 may include a service module 130 configured to process the response data 108. In some implementations, the service module 130 generates the service calls 106.

The service module 130 may be configured to determine when to provide service calls 106 to the service fleet 102 based on the weight data 126. For example, for a given time period (e.g., one minute), the service fleet 102 may allocate a maximum value of resources usable by the client device 104(1). The maximum value may be expressed as a number such as 50 units of resource consumption. The service calls 106 provided by the client device 104(1) may each consume 10 units. In this example, the service module 130 may determine to provide no more than 5 service calls 106 per minute to the service fleet 102 because any more than 5 service calls 106 would result in more than the maximum amount of resource consumption being used. By providing a number the of service calls 106 to the service fleet 102 which consumes less or equal to the maximum amount, fewer resources are consumed by the service fleet 102. Fewer resources are consumed because if too many requests are made, the service fleet 102 may consume resources to indicate to the client device 104(1) that the client device 104(1) has asked the service fleet 102 to process more than the maximum amount of service calls 106. Other resources may be consumed to block a particular service call 106 from being processed.

In some implementations, the service host 114 is configured to determine whether or not to provide a particular service call 106 to the sampler host 112. The service host 114 may determine whether or not to provide a particular service call 106 to the sampler host 112 based on whether a threshold amount of resource consumption data 122 has been generated for a particular type of service call 106. In another example, the service host 114 may determine whether or not to provide a particular service call 106 to the sampler host 112 based on a predetermined time interval. For a given type of service call 106 from a given client device 104, the service host 114 may provide the service call 106 to the sampler host 112 every hour, or every 24 hours. In these implementations, the load balancer 110 may not be configured to make the determination of whether or not to provide a particular service call 106 to the sampler host 112. The load balancer 110 may allocate the service calls 106 to different service hosts 114.

Figure 2:
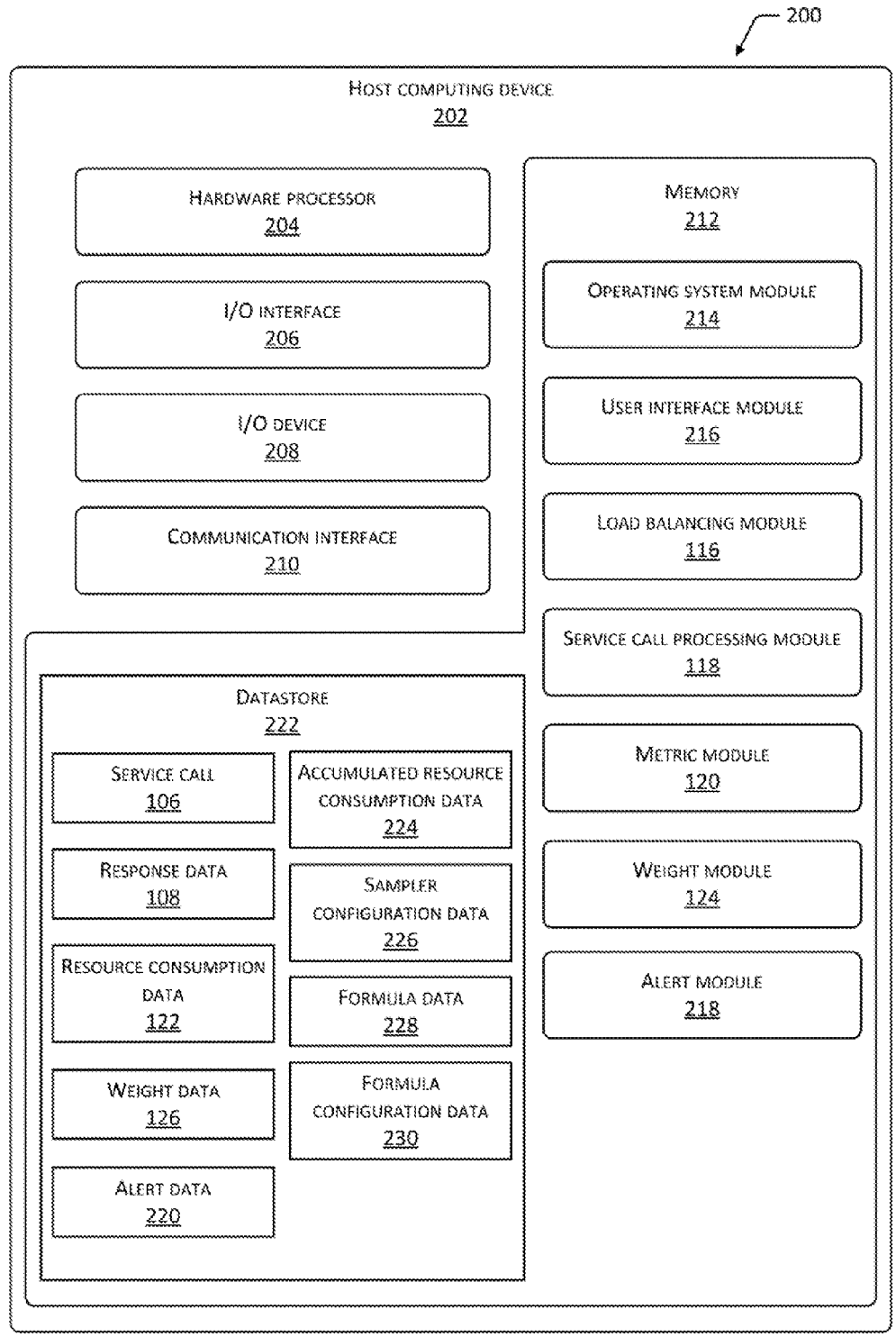
FIG. 2 is a block diagram of a computing device configured to generate weight data based on different service calls which consume resources.

FIG. 2 is a block diagram 200 of a host computing device 202 configured to generate the weight data 126 based on different service calls 106 which consume resources. At least one of the load balancer 110, the sampler host 112, or the service host 114 may be implemented as the host computing device 202. The host computing device 202 may include at least one hardware processor 204 configured to execute stored instructions. The at least one hardware processor 204 (or "processor") may comprise one or more cores.

The host computing device 202 includes at least one I/O interface 206 which enables portions of the host computing device 202 (e.g., the hardware processor 204) to communicate with other devices. The I/O interface 206 may be configured to implement various protocols, such as include inter-integrated circuit ("I2C"), serial peripheral interface bus ("SPI"), Universal Serial Bus ("USB"), RS-232, HDMI, TOSLINK, Bluetooth®, and so forth. The at least one I/O interface 206 may be operatively connected to at least one I/O device 208. In some implementations, certain I/O devices 208 are physically incorporated with the host computing device 202 or externally placed.

The at least one I/O device 208 may include one or more input devices such as a button or a microphone. The I/O device 208 may include one or more of a variety of output devices such as one or more displays or speakers.

The host computing device 202 may include at least one communication interface 210. The communication interface 210 may be configured to provide communications between the host computing device 202 and other devices, such as the client device 104, routers, access points, servers, other host computing devices 202, and so forth. The communication interface 210 may connect to the network.

The host computing device 202 may include at least one bus or other internal communications hardware or software that enables for the transfer of data between the various modules and components of the host computing device 202.

As illustrated in FIG. 2, the host computing device 202 may include at least one memory or memory device 212. The memory 212 may include at least one non-transitory computer-readable storage media ("CRSM"). The CRSM may include at least one of an electronic storage medium, a magnetic storage medium, an optical storage medium, a quantum storage medium, or a mechanical computer storage medium. The memory 212 may include computer readable instructions, data structures, program modules, and other data for the operation of the host computing device 202.

The memory 212 may include at least one operating system ("OS") module 214. The OS module 214 may be configured to manage hardware resources such as the I/O interface 206, the I/O devices 208, the communication interface 210, and provide various services to applications or modules executing on the hardware processor 204. The memory 212 may also store at least one of the following modules which may be executed as foreground applications, background tasks, daemons, and so forth.

In some implementations, a user interface module 216 is configured to provide a user interface to the user using the I/O devices 208 and to accept inputs received from the I/O devices 208. The user interface may include one or more visual, audible, or haptic elements. For example, the user interface may be configured to provide a graphic user interface, an audible user interface, and so forth.

The memory 212 may include the load balancing module 116. The load balancing module 116 may be configured to receive or access the service calls 106 from the client devices 104. The load balancing module 116 may be configured to determine where to provide the service calls 106. For example, the load balancing module 116 may be configured to determine whether to provide a given service call 106 to the sampler host 112 or one of the service hosts 114. The determination to send the service call 106 to the sampler host 112 may be based on whether a threshold amount of certain types of previous service calls 106 has been provided to the sampler host 112. In some implementations, the more service calls 106 which are processed by the sampler host 112, the more accurate the value of the weight data 126 will be, because the value of the weight data 126 is determined based on an average amount of resources consumed by the service calls 106.

The memory 212 may include the service call processing module 118 configured to perform one or more requested computational tasks based on the service calls 106. The service call processing module 118 may generate the response data 108 which includes the information requested by the client device 104.

The memory 212 may include the metric module 120 configured to generate the metric data. The metric data may comprise the resource consumption data 122. The metric data may comprise information about one or more metric values indicative of one or more quantitative measurements of operation or performance while executing one or more computational tasks. The metrics may be generated during processing of actual service calls, or based on the execution of benchmark tests using predetermined service calls 106 or sample service calls 106.

The memory 212 may include the service call processing module 118 configured to perform one or more requested computational tasks. For example, the service call processing module 118 may calculate a value from inputs, retrieve information from a database, and so forth. The service call processing module 118 may generate the response data 108 including information requested by the client device 104.

The memory 212 may include an alert module 218 configured to generate alert data 220. The alert data 220 may comprise information indicating an occurrence of the value of the weight data 126 being equal to or more than the threshold value. A relatively high value of the weight data 126 may indicate an unexpected change in the service call 106 which may cause problems for the service fleet 102. One problem may be an overload because the service fleet 102 may not have enough resources to handle the increase in the amount of resource consumption. The alert module 218 may provide the alert data 220 to a computing device executing a monitoring service associated with an administrative user of the service fleet 102. The administrative user may plan on how to solve any possible issues that may arise because of the increase in the resource consumption. For example, the administrative user may plan to acquire additional hardware for the service fleet 102, or contact an administrative user associated with the source of the service call 106, to inform the user of the increase in the resource consumption.

In some implementations, the memory 212 includes a datastore 222 for storing information. The datastore 222 may use a flat file, database, linked list, tree, or other data structure to store the information. In some implementations, the datastore 222, or a portion thereof, may be distributed across at least one other device, such as a server, a network storage device, and so forth. As illustrated in FIG. 2, the datastore 222 may include at least one of the service call 106, the response data 108, the resource consumption data 122, the weight data 126, the alert data 220, accumulated resource consumption data 224, sampler configuration data 226, formula data 228, or formula configuration data 230.

The service call 106 may comprise data representing a request for the service fleet 102 to execute one or more computational tasks. The computational tasks may include calculating value from inputs, retrieve information from a database, and so forth. The response data 108 may comprise information requested by the service call 106.

The resource consumption data 122 may include a value indicating an amount of resources consumed to perform one or more computational tasks that are requested by the service calls 106 and processed by the service call processing module 118. The resource consumption data 122 may be generated by the metric module 120. The resource consumption data 122 may be generated during processing of actual service calls 106, or based on the execution of benchmark tests using predetermined service calls 106 or sample service calls 106.

The weight data 126 may be representative of a value generated based on an average amount of resources consumed to perform certain computational tasks. The certain computational tasks may be requested by service calls 106 processed by the service call processing module 118.

As discussed above, the alert data 220 may comprise information indicating an occurrence of the value of the weight data 126 being equal to or more than the threshold value. A relatively high value of the weight data 126 may indicate an unexpected change in the service call 106 which may cause problems for the service fleet 102 such as an overload because the service fleet 102 may not have enough resources to handle the increase in the amount of resource consumption.

The accumulated resource consumption data 224 may comprise a value generated based on a sum of the amount of resources consumed to process the computational tasks performed by predecessor service fleets 102. The predecessor service fleet 102 and the accumulated resource consumption data 224 are described in more detail with regard to FIG. 3. The metric module 120 may be configured to generate the accumulated resource consumption data 224.

The sampler configuration data 226 may be used to configure one or more computing hosts of the service fleet 102 to operate as the sampler host 112. In one example, the sample configuration data 226 causes one of the service hosts 114 to operate as the sampler host 112 by configuring the service host 114 to have only one connection available with the load balancer 110, resulting in the sampler host 112 processing a single service call 106 at a time. The user interface module 216 may be configured to enable a user to operate with an input device to input the sampler configuration data 226.

The formula data 228 may be used to determine the value of the weight data 126. The formula data 228 may cause the weight module 124 to sum different averages of amounts of different resources consumed. For example, using the formula data 228, for a given type of service call 106, the weight module 124 may determine the average amount of memory consumed is 50 units, and the average amount of processor usage is 25 units. Using the formula data 228, the weight module 124 may determine the value of the weight data 126 by summing the 50 units and the 25 units, indicating a value of 75 units.

The formula configuration data 230 may be used to configure the formula data 228. The formula configuration data 230 may be used to adjust the weight of one or more the averages of the amounts of the resources consumed. The formula configuration data 230 may include data representing weight factors which are discussed in more detail below with regard to FIG. 5. The user interface module 216 may be configured to enable a user to operate with an input device 208 to input the formula configuration data 230.

Figure 3:
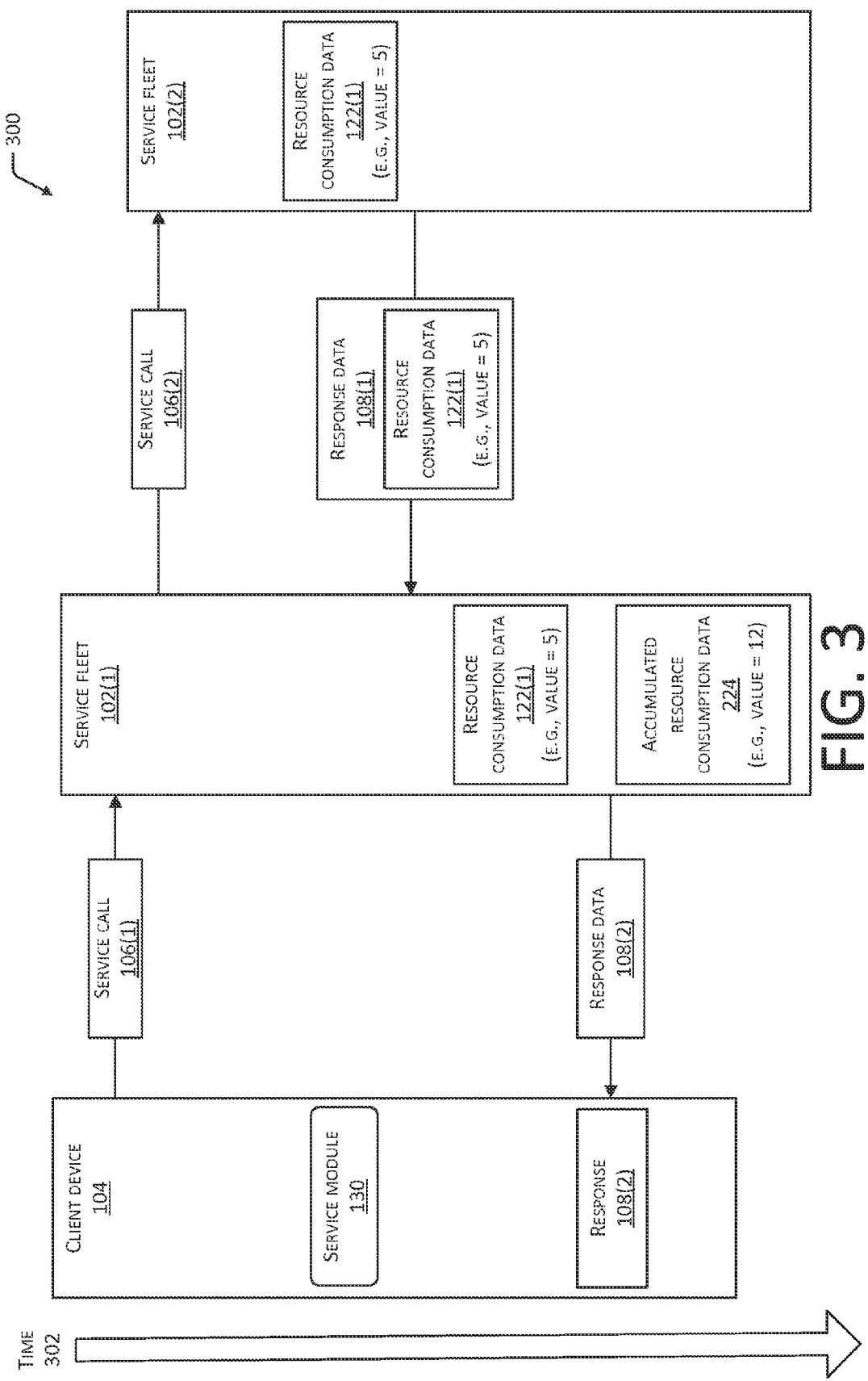
FIG. 3 is a block diagram of a service call pattern involving a predecessor service fleet and generating accumulated resource consumption data for a service call pattern.

FIG. 3 is a block diagram of a service call pattern involving a predecessor service fleet 102, and generating the accumulated resource consumption data 224 for a service call pattern. In this illustration, time 302 increases down the page, as indicated by the arrow. The series of service calls 106(1) and 106(2) and responses 108(1) and 108(2) together comprise a service call pattern.

In FIG. 3, the client device 104 provides the service call 106(1) to the service fleet 102(1). In one example, the service call 106(1) indicates a request for information about products based on entered search terms. To provide the information, the service fleet 102(1) performs a first computational task. To perform the first computational task, the service fleet 102(1) in turn provides service call 106(2) to the service fleet 102(2), requesting another computational task. Continuing the example, the service call 106(2) may request image data depicting the products associated with the requested search results.

In response to receiving the service call 106(2), the service fleet 102(2) may generate response data 108(1). Continuing with the example, the response data 108(1) includes the image data depicting the products associated with the requested search results.

In this example, the service fleet 102(2) generates resource consumption data 122(1). The resource consumption data 122(1) may include a one or more values that represent the amount of resources consumed to process the one or more computational tasks performed by the service fleet 102(2). As shown in FIG. 3, for the service fleet 102(2), the resource consumption data includes a value of "5".

In FIG. 3, the service fleet 102(2) provides the response data 108(1) to the service fleet 102(1). In this example, the response data 108(1) includes the resource consumption data 122(1).

Based on the response data 108(1), the service fleet 102(1) generates the response data 108(2). Continuing with the example, the service fleet 102(1) may retrieve product description information for the products and combine this information with the image data depicting the products associated with the requested search.

The service fleet 102(1) generates the accumulated resource consumption data 224. In this example, the accumulated resource consumption data 224 represents a sum of the amount of resources consumed to process the computational tasks performed by the service fleets 102(1) and 102(2). As shown in FIG. 3, the sum of the resources consumed includes a value of 12 units. The 7 additional units indicate the amount of resources consumed by the service fleet 102(1).

Responsive to the service call 106(1) received from the client device 104, the service fleet 102(1) provides the response data 108(2) to the client device 104. The service module 130 is configured to process the response data 108(2).

In some implementations, the service call 106(2) may include data representative of a request for the resource consumption data 122(1). In these implementations, the response data 108(1) may not include the resource consumption data 122(1) unless the service call 106(2) includes the request. At certain times, the service fleet 102(1) may not need the resource consumption data 122(1). By not providing the resource consumption data 122(1) resources consumed by the service fleet 102(2) to provide the resource consumption data 122(1) may be reduced or eliminated.

Figure 4:
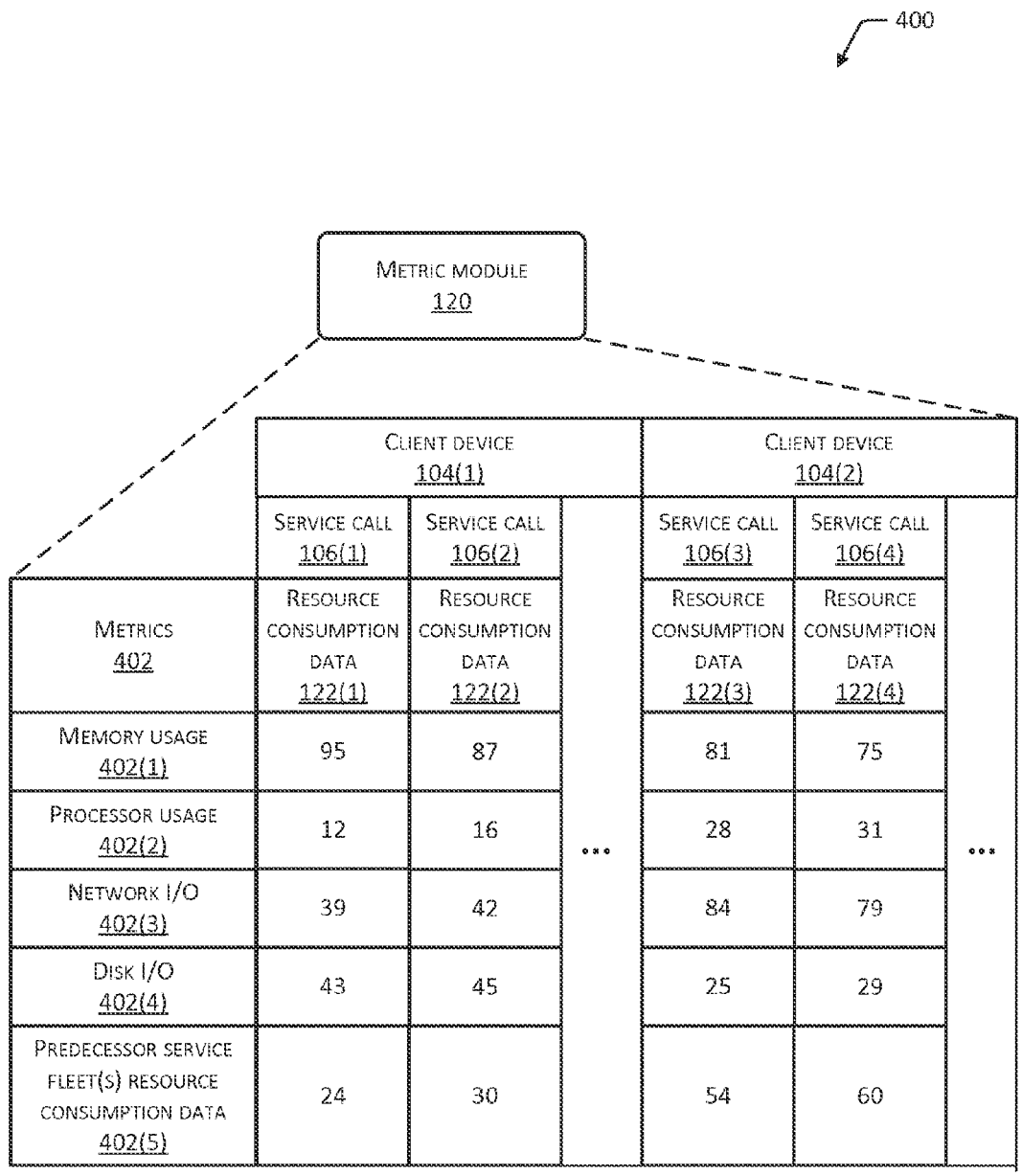
FIG. 4 is an illustration of the generation of the resource consumption data for different service calls for different client devices.

FIG. 4 is an illustration 400 of the generation of the resource consumption data 122 for different service calls 106 for different client devices 104. As described above, the metric module 120 generates metric data. The metric data includes metrics 402.

The metrics 402 include memory usage 402(1), processor usage 402(2), network I/O 402(3), disk I/O 402(4), and predecessor service fleet(s) resource consumption data 402(5), and so forth. As described above, the metric data may include the resource consumption data 122. The resource consumption data 122 may have an associated value. For example, the resource consumption data 122(1) indicates a value of "95" for the memory usage 402(1) for the service call 106(1) processed by the client device 104(1).

The service fleet 102 may determine the weight data 126 based on averages of different values of the resource consumption data 122 for a type of service call 106 for a client device 104. In one example, the service call 106(1) and 106(2) are the same type of service call 106. For the memory usage 402(1) and for the client device 104(1), the service fleet 102 averages the amount of resources consumed by averaging the values "95" and "87", which is "91" (not shown). For the processor usage 402(2) and for the client device 104(1), the service fleet 102 averages the amount of resources consumed by averaging the values "12" and "16", which is "14" (not shown). The service fleet 102 may sum each of the averages of the different resources consumed to generate the value of the weighted data 126. Continuing with the example, the service fleet 102 may sum the values "91" and "14" which is "105" (not shown).

Using these techniques, the metric module 120 is thus able to generate the different resource consumption data 122 for different service calls 106 for different client devices 104. Such a configuration enables the service fleet 102 to determine weight values for individual service call 106 types for individual client device 104. By determining the weight associated with these service calls 106, the service fleet 102 may implement a throttling mechanism to determine when to process the service calls 106.

Figure 5:
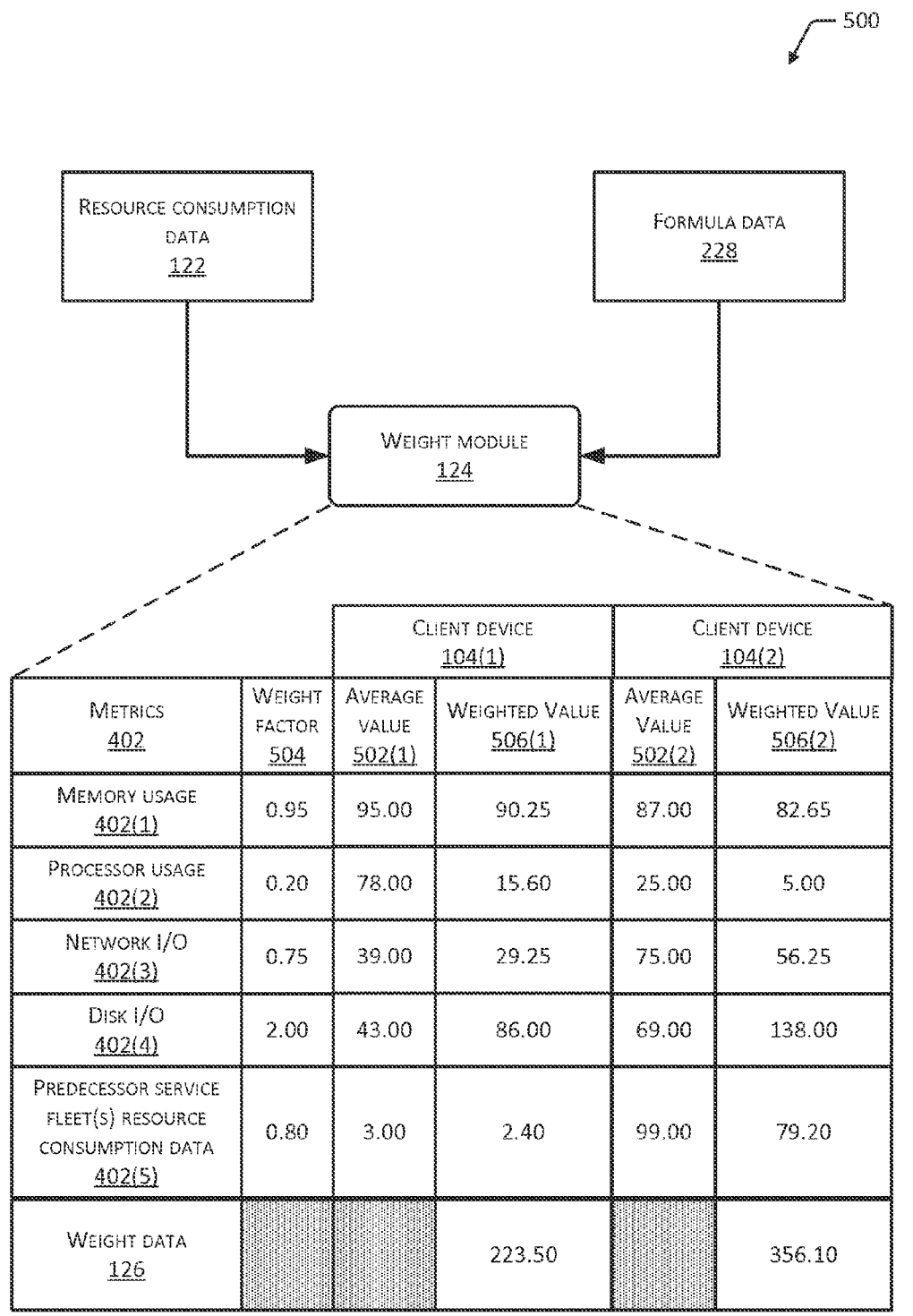
FIG. 5 is an illustration of the generation of the weight data based on the resource consumption data and formula data.

FIG. 5 is an illustration 500 of the generation of the weight data 126 based on the resource consumption data 122 and the formula data 228. The weight module 124 accesses the resource consumption data 122 which may be stored in the datastore 222. The resource consumption data 122 may include a table that includes information that may be visualized as being organized in columns and rows. The information in the table may indicate different amounts of resources used to process different service calls 106 for different client devices 104.

The weight module 124 accesses the formula data 228. The formula data 228 may include data representative of an algorithm or a formula which is applied to the resource consumption to generate the weight data 126.

In FIG. 5, the metrics 402 include the memory usage 402(1), the processor usage 402(2), the network I/O 402(3), the disk I/O 402(4), and the predecessor service fleet(s) resource consumption data 402(5). For the different resources, and for the different client devices 104, the weight module 124 may determine the average value 502 indicating an amount of resources consumed. For example, for client device 104(1), the memory usage 402(1) indicates a value of "95" 502(1) indicating an average amount of memory used to perform service calls 106 for the client device 104(1).

The weight factors 504 are configured to allow configuration of how the weight data 126 is generated. The service fleet 102 may be configured to enable the user to select or change one or more of the weight factors 504 using an input device 208.

In FIG. 5 the weight factor 504 is illustrated as a factor to develop a weighted mean, wherein the average value 502 is multiplied by the weight factor 504. For example, the weight factor 504 may be set to less than one to diminish the impact of a particular metric 402 or greater than one to increase the impact of a particular metric 402 on the weight data 126. In other implementations, functions other than, or in addition to, the weighted mean may be used.

Continuing the example, the metric for processor usage 402(2) is given a relatively low weight factor 504 of "0.20", while the disk I/O 402(4) has a weight factor 504 of "2.00". As a result, the value of the weight data 126 for the client device 104(1) may be more significantly impacted by the disk I/O 402(4) than the processor usage 402(2). The weight factors 504 may be adjusted, allowing for the weights to be tailored to particular analytical tasks.

The weighted values 506 may be summed or otherwise combined to generate the value of the weight data 126. Continuing the example, in this illustration the client device 104(1) has a total weight of "223.50". As illustrated here, the predecessor service fleet(s) resource consumption data 402 (5) may comprise the weight data 126 received from predecessor service fleets 102 in a given service call pattern. Using these techniques, the weight module 124 is thus able to generate the weight data 126.

While the weight factor 504 is described as being applied to the average values 502(1) and 502(2), in other implementations, different weight factors 504 may be applied to at least one of different types of services or different client devices 104. For example, a first weight factor 504 may apply to the client device 104(1) and a second, different weight factor 504 may apply to the client device 104(2). In another example, a first weight factor 504 may apply to a first type of service call 106 provided by the client device 104(1), and a second, different weight factor 504 may apply to a second, different type of service call 106 provided by the client device 104(1).

Figure 6:
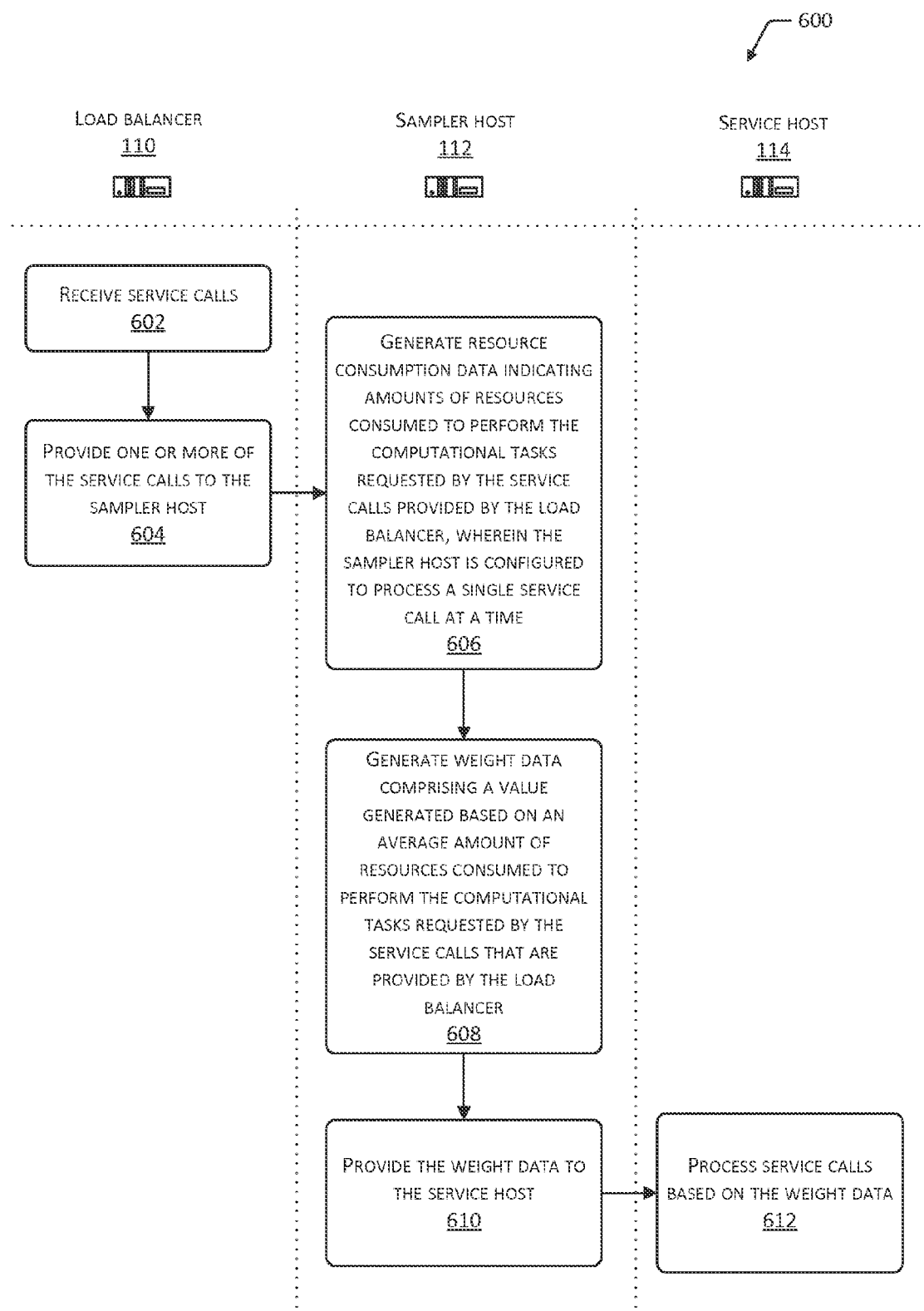
FIG. 6 is a flow diagram illustrating a process of generating the weight data, and providing the weight data to the service host.

FIG. 6 is a flow diagram illustrating a process 600 of generating the weight data 126, and providing the weight data 126 to the service host 114. Although the process 600 is described with reference to the flowchart illustrated in FIG. 6, many other methods performing the acts associated with the process 600 may be used. For example, the order of the steps may be changed, some of the steps described may be optional, and additional steps may be included.

At block 602, the load balancer 110 receives service calls 106. A given service call 106 may comprise data representing a request for the service fleet 102 to execute one or more computational tasks. The computational tasks may include calculating a value from inputs, retrieve information from a database, and so forth. The services calls 106 may be provided from different client devices 104. A given service call 106 may be a different type of service call from another. For example, the service calls 106 may be different in layout, composition, encoding, and so forth. A first client device 104 may generate a first type of service call 106 having a first type or expression, and a second client device 104 may generate a service call 106 having a second, different type or expression. In some implementations, a single client device 104 may be configured to generate different types of service calls 106.

At block 604, the load balancer 110 provides one or more of the service calls 106 to the sampler host 112. In some implementations, the load balancer 110 provides a particular service call 106 to the sampler host 112 in response to a determination that less than a threshold amount of resource consumption data 122 has been generated. In response to a determination that more than the threshold amount of resource consumption data 122 has been generated, the load balancing module 116 provides a given service call 106 to one or more service hosts 114 for processing, rather than the sampler host 112.

At block 606, the sampler host 112 generates the resource consumption data 122 indicating amounts of resources consumed to perform the computational tasks requested by the service calls 106 provided by the load balancer 110. The resources consumed may include resources such as processor, memory, network bandwidth, and so forth. In this example, the sampler host 112 is configured to process a single service call 106 at a time. When the sampler host 112 processes a single service call 106, the sampler host 112 may be performing other computational tasks such as computational tasks that manage the system hardware. Processing a single service call 106 at a time may be visualized as processing service calls in sequence.

At block 608, the sampler host 112 generates the weight data 126 comprising a value generated based on an average amount of resources consumed to perform the computational tasks requested by the service calls 106 that are provided by the load balancer 110. In some implementations, the value of the weight data 126 is generated based on the formula data 228 used to determine a sum of different averages of amounts of different resources consumed. For example, for a given type of service call 106, the weight module 124 may determine that the average amount of memory usage is 50 units, and that the average amount of processor usage is 25 units. The weight module 124 may determine the value of the weight data 126 by summing the 50 units and the 25 units, indicating a value of 75 units.

At block 610, the sampler host 112 provides the weight data 126 to the service host 114. In some implementations, the sampler host 112 provides the weight data 126 to the service hosts 114 in response to a determination that a threshold amount of resource consumption data 122 has been generated. Because the weight data 126 is based on an average, administrative users may feel more confident in the accuracy and the ability to predict the amount of resources of a future service call 106 after some threshold amount of previous service calls 106 have been analyzed.

At block 612, the service host 114 processes service calls 106 based on the weight data 126. The service host 114 may implement a throttling mechanism to process the service calls 106 based on the weight data 126. The throttling mechanism may control the number of service calls 106 the service host 114 processes within a specified period of time. Such a configuration helps avoid overloading the service host's 114 processing capacity.

Figure 7:
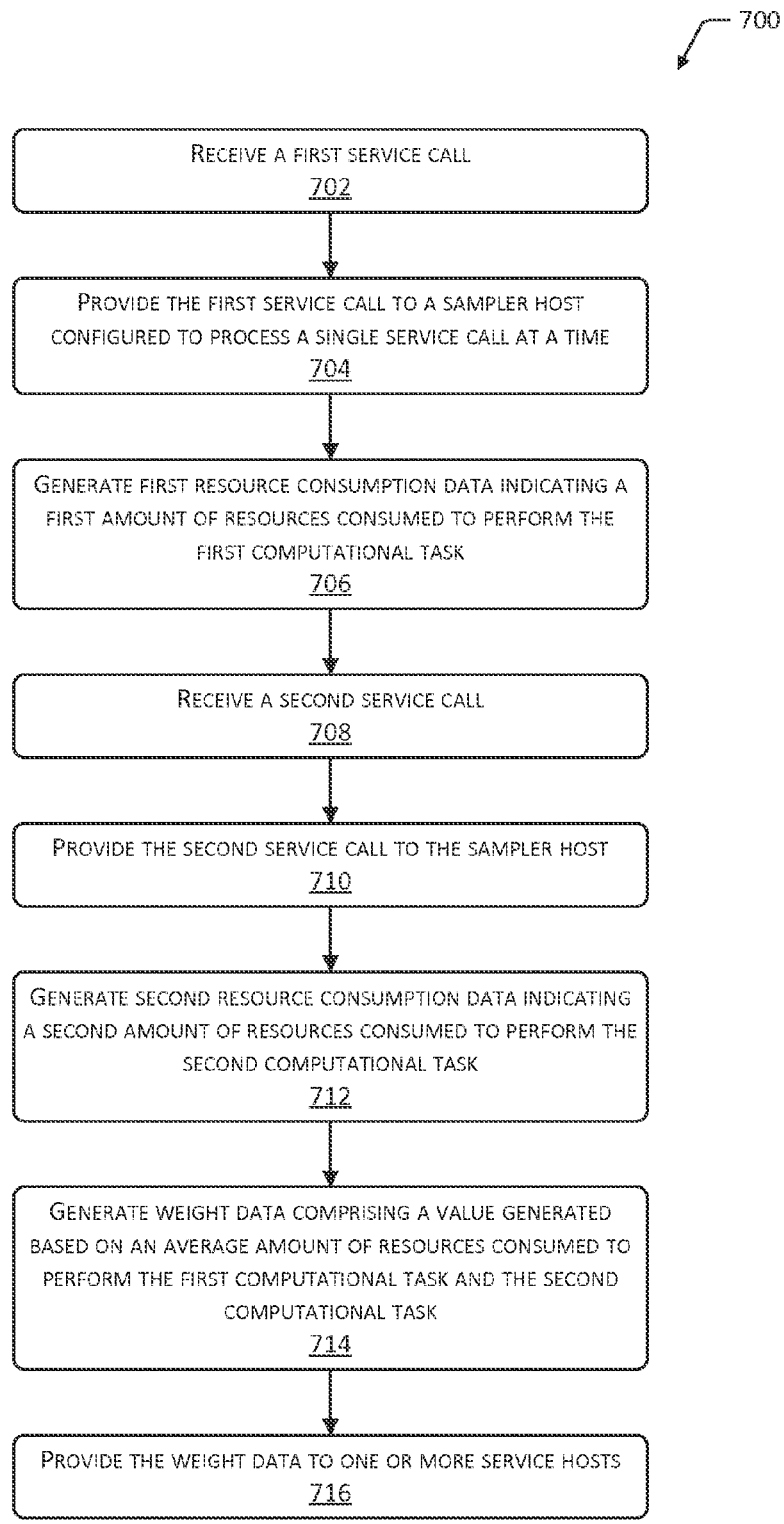
FIG. 7 is a flow diagram illustrating a process of generating the weight data based on an average amount of resources consumed to perform computational tasks.

FIG. 7 is a flow diagram illustrating a process 700 of generating the weight data 126 based on an average amount of resources consumed to perform computational tasks. Although the process 700 is described with reference to the flowchart illustrated in FIG. 7, many other methods performing the acts associated with the process 700 may be used. For example, the order of the steps may be changed, some of the steps described may be optional, and additional steps may be included.

At block 702, the load balancer 110 receives a first service call 106. For example, in FIG. 1, the load balancer 110 may receive the service call 106(1) from the client device 104(1).

At block 704, the load balancer 110 provides the first service call 106 to the sampler host 112 configured to process a single service call 106 at a time. The load balancer 110 may provide the first service call 106 to the sampler host 112 in response to a determination that the value of the weight data 126 for the first service call 106 has not been generated based on enough information. In some implementations, the load balancer 110 provides the first service call 106 to the sampler host 112 based on a predetermined period of time. For example, the load balancer 110 may be configured to provide service calls 106 to the sampler host 112 every hour, or every 24 hours. As discussed above, processing a single service call 106 at a time may include a configuration including a first hardware processor executing a first service call 106, and a second hardware processor contemporaneously executing a second service call 106.

At block 706, the sampler host 112 generates first resource consumption data 122 indicating a first amount of resources consumed to perform the first computational task. The first amount of resources may indicate different values for different types of resources consumed. For example, the first amount of resources may indicate that to perform the first service call 106, 15 units of memory were consumed, and 20 units of processor were consumed.

At block 708, the load balancer 110 receives a second service call 106. At block 710, the load balancer 110 provides the second service call 106 to the sampler host 112. At block 712, the sampler host 112 generates second resource consumption data 122 indicating a second amount of resources consumed to perform the second computational task.

At block 714, the sampler host 112 generates the weight data 126 comprising a value generated based on an average amount of resources consumed to perform the first computational task and the second computational task. In one example, for the first computational task, 20 units of memory and 40 units of processor are consumed. For the second computational task, 24 units of memory and 38 units of processor are consumed. The sampler host 112 may generate the value of the weight data 126 by summing the averages of the resources consumed. Continuing with the example, the sampler host 112 averages the amount of memory consumed by averaging the values of 20 and 24 to arrive at 22. The sampler host 112 averages the amount of processor consumption values of 40 and 38 to arrive at 39. To determine the value of the weight data 126, the sampler host 112 may sum the values of 22 and 39 to arrive at a value for the weight data 126 of 61.

At block 716, the service fleet 102 provides the weight data 126 to one or more service hosts 114. The one or more service hosts 114 may be configured to contemporaneously process service calls 106. Contemporaneous processing may include processing in which the corresponding service calls 106 are processed such that they are processed exactly simultaneously, or may be within a predetermined window of time, such as within ±50 ms of one another.

In some implementations, the value of the weight data 126 is indicative of a maximum amount of resources consumed by a type of service call 106 over a period of time. For example, over a week, the sampler host 112 may determine that the maximum amount of resources consumed was "56.76" (not shown). In this example, the sampler host 112 does not average the values; rather the sampler host 112 determines the maximum value over a designated period of time. This information may be provided to the service hosts 114 which use the weight data 126 to regulate the amount of service calls 106 which are processed.

In some implementations, the service fleet 102 includes a plurality of sampler hosts 112. By increasing the number of sampler hosts 112, the amount of time to generate the threshold amount of weight data 126 for a particular type of service call 106 may be reduced. In these implementations, the plurality of sampler hosts 112 may be configured to provide the resource consumption data 122 to a centralized host (e.g., a service host 114) configured to determine the weight data 126 based on the resource consumption data 122 provided by the individual sampler hosts 112. In another implementation, the plurality of sampler hosts 112 may be configured to communicate with one another, providing the generated resource consumption data 122 to one another. In this example, an individual sampler host 112 may be configured to generate the weight data 126 using resource consumption data 122 provided by other sampler hosts 112.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
a service fleet comprising a plurality of host computing devices, the plurality of host computing devices including:
a memory storing computer-executable instructions; and
a processor, coupled to the memory, to execute the computer-executable instructions to provide a load balancer, a sampler host, and a service host, wherein:
the load balancer is configured to:
receive service calls including a first service call comprising a first request for a first performance of a first computational task, a second service call comprising a second request for a second performance of a second computational task, and a third service call comprising a third request for a third performance of a third computational task;
provide the first service call and the second service call to the sampler host; and
provide the third service call to the service host;
the sampler host is configured to:
process a single service call at a time to individually determine resource consumed by each of the service calls;
for the first service call, generate first resource consumption data indicating a first amount of resources consumed to perform the first computational task;
for the second service call, generate second resource consumption data indicating a second amount of resources consumed to perform the second computational task;
access configurable formula data indicative of a first weight factor associated with the first resource consumption data and indicative of a second weight factor associated with the second resource consumption data;
generate a first weighted value by multiplying the first weight factor by the first resource consumption data;
generate a second weighted value by multiplying the second weight factor by the second resource consumption data;
generate weight data comprising a value generated by combining the first weighted value and the second weighted value; and
provide the weight data to the service host in response to a determination that a threshold amount of resource consumption data has been generated;
the service host is configured to process the third service call based on the weight data.

2. The system of claim 1, wherein:
the first resource consumption data and the second resource consumption data indicative of the amount of resources consumed to perform the first computational task and the second computational task includes at least one of:
information indicative of an average amount of resources consumed to perform the first computational task and the second computational task;
information indicative of a maximum amount of resources consumed to perform the first computational task and the second computational task; and
information indicative of a cost to perform the first computational task and the second computational task.

3. The system of claim 1, wherein:
the first service call, the second service call, and the third service call are a first type of service call, the first service type of service call comprising service calls sharing characteristics different from service calls being of a second type of service call;
the information indicative of the amount of resources includes a first average amount of resources consumed to perform the first computational task and the second computational task;
the weight data includes the first weighted value associated with the first type of service call; and
the second weighted value associated with the second type of service call.

4. A method comprising:
receiving, by a load balancer, a first service call comprising a request for performance of a first computational task;
providing the first service call to a first host, the first host comprising one or more computing devices configured to process a single service call at a time;
generating first resource consumption data indicating a first amount of resources consumed to perform the first computational task;
receiving, by a load balancer, a second service call comprising a request for performance of a second computational task;
providing the second service call to the first host;

generating second resource consumption data indicating a second amount of resources consumed to perform the second computational task;

accessing configurable formula data indicative of a first weight factor associated with the first resource consumption data and indicative of a second weight factor associated with the second resource consumption data;

generating a first weighted value by multiplying the first weight factor by the first resource consumption data;

generating a second weighted value by multiplying the second weight factor by the second resource consumption data;

generating weight data comprising a value generated by combining the first weighted value and the second weighted value; and providing the weight data to one or more second hosts in response to a determination that a threshold amount of resource consumption data has been generated, the one or more second hosts being configured to contemporaneously process a third service call and a fourth service call based on the weight data.

5. The method of claim 4, wherein the first host is configured to process a single service call in response to the first host receiving configuration data used to cause the first host to be configured to have a single connection with the load balancer.

6. The method of claim 4, further comprising:
determining that less than a threshold amount of resource consumption data has been generated; and
providing the first service call to the first host in response to the determination that less than the threshold amount of resource consumption data has been generated, wherein the threshold amount is a predetermined amount determined based on a level of confidence in accuracy of the value of the weight data.

7. The method of claim 4, wherein the first amount of resources consumed to perform the first computational task comprise at least one of processor resources consumed within a first period of time, memory resources consumed within a second period of time, network resources consumed within a third period of time; or disk resources consumed within a fourth period of time.

8. The method of claim 4, wherein the first service call is provided to the first host based on a predetermined time interval, the predetermined time interval being generated based on inputs received from an administrative user associated with the first host.

9. The method of claim 4, wherein the first amount of resources consumed to perform the first computational task comprises an accumulated amount of resources consumed to perform the first computational task, the accumulated amount including an amount of resources consumed by one or more predecessor service fleets comprising one or more computing devices used to perform other computational tasks to support the performance of the first computational task, wherein the other computational tasks are performed before the first computational task is performed.

10. The method of claim 4, wherein:
the weight data comprises the first weighted value associated with the first type of service call, the first type of service call comprising service calls sharing characteristics different from service calls being of a second type of service call; and
the first, second, third and fourth service calls are of the first type of service call.

11. The method of claim 10, further comprising generating the second weighted value associated with the second type of service call based on a second average amount of resources consumed to perform the second type of service call, wherein the second average amount of resources is generated based on at least a fifth service call and a sixth service call which are of the second type of service call.

12. The method of claim 4, further comprising:
determining that a threshold amount of resource consumption data has been generated; and
in response to the determination that the threshold amount of resource consumption data has been generated, determining to provide the weight data to the one or more second hosts, wherein the threshold amount is a predetermined amount determined based on a level of confidence in accuracy of the value of the weight data.

13. The method of claim 4, wherein:
the first amount of resources consumed to perform the first computational task is determined based on a first average amount of a first resource consumed and the second average amount of a second resource consumed; and
the value of the weight data is generated based on a weighted sum of the first average and the second average.

14. The method of claim 13, wherein the formula data is configurable by enabling a user to set one or more factors used to adjust at least one weight factor applied to the first average or the second average.

15. The method of claim 4, further comprising:
receiving a fifth service call comprising a request for performance of a fifth computational task;
providing the fifth service call to a third host, the third host comprising one or more computing devices configured to process a single service call at a time;
generating third resource consumption data indicating a third amount of resources consumed to perform the fifth computational task; and
wherein the value of the weight data is further generated based on the amount of resources consumed to perform the first computational task, the second computational task, and the fifth computation task.

16. The method of claim 4, wherein the one or more service hosts are configured to determine when to process the third service call and the fourth service call based on the weight data.

17. A method comprising:
receiving service calls for processing a single service call at a time to determine resources consumed for each individual service call;
for a first plurality of service calls having a first type, generating first weighted value by multiplying a first weight factor by first resource consumption data indicating a first amount of resources consumed to perform first computational task associated with the first plurality of service calls;
for a second plurality of service calls having a second type, generating second weighted value by multiplying a second weight factor by second resource consumption data indicating a second amount of resources consumed to perform second computational task associated with the second plurality of service calls;
generating weight data comprising a value generated by combining the first weighted value and the second weighted value; and
providing the weight data to one or more service hosts in response to a determination that a threshold amount of resource consumption data has been generated, the one or more service hosts being configured to determine when to process other service calls based on the weight data.

18. The method of claim 17, wherein the first plurality of service calls and the second plurality of service calls are provided by a client computing device.

19. The method of claim 17, wherein:
the first plurality of service calls are provided by a first client device, the first client device being a first type of device; and
the first weighted value is further generated based on the type of the device.

20. The method of claim 17, further comprising:
determining that the weight data is equal to or more than a threshold value;
generating alert data indicating the occurrence of the weight data being equal to or more than the threshold value; and
providing the alert data to a computing device executing a monitoring service associated with an administrative user of a service fleet.

* * * * *